United States Patent
Falk et al.

(10) Patent No.: US 12,452,240 B2
(45) Date of Patent: Oct. 21, 2025

(54) AUTHENTICATING A COMMUNICATION PARTNER ON A DEVICE

(71) Applicant: Siemens Aktiengesellschaft, Munich (DE)

(72) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 317 days.

(21) Appl. No.: 18/021,428

(22) PCT Filed: Aug. 10, 2021

(86) PCT No.: PCT/EP2021/072237
§ 371 (c)(1),
(2) Date: Feb. 15, 2023

(87) PCT Pub. No.: WO2022/037997
PCT Pub. Date: Feb. 24, 2022

(65) Prior Publication Data
US 2024/0039910 A1    Feb. 1, 2024

(30) Foreign Application Priority Data

Aug. 18, 2020    (EP) .................................. 20191531

(51) Int. Cl.
*H04L 9/40*    (2022.01)
(52) U.S. Cl.
CPC ...... *H04L 63/0876* (2013.01); *H04L 63/0823* (2013.01); *H04L 63/108* (2013.01)
(58) Field of Classification Search
None
See application file for complete search history.

(56) References Cited

U.S. PATENT DOCUMENTS

| 9,626,512 B1 * | 4/2017 | Brandwine ......... G06F 9/45533 |
| 11,283,863 B1 * | 3/2022 | Cleaver ............... H04L 67/1008 |

(Continued)

FOREIGN PATENT DOCUMENTS

| WO | WO 2019243429 A1 | 12/2019 |
| WO | WO 2020011777 A1 | 1/2020 |

OTHER PUBLICATIONS

Siemens AG et a; "Digital-Twin-Zertifikat"; Prior Art Publishing GMBH, Manfred-Von-Richthofen-Str. 9, 12101 Berlin; Bd. www. priorartregister.com; pp. 1-5; XP007022409; 2019.

(Continued)

*Primary Examiner* — Scott B Christensen
(74) *Attorney, Agent, or Firm* — Schmeiser, Olsen & Watts, LLP (57) ABSTRACT

A method for authenticating a communication partner on a device is provided, in which method, in addition to a physical device implementation, there is at least one virtual device implementation allocated to the device, the method having the following steps: —receiving an access authorization of a communication partner in one first of these two device implementations, —checking, by the first device implementation, the access authorization and —if the access authorization is deemed permissible, providing an authorization verification from the first device implementation to the communication partner, and —permitting an access to the second device implementation of these two device implementations by the communication partner by the authorization verification.

15 Claims, 3 Drawing Sheets

(56) References Cited

U.S. PATENT DOCUMENTS

| | | | | |
|---|---|---|---|---|
| 2007/0118875 A1* | 5/2007 | Chow | ................ | H04L 63/0846 |
| | | | | 726/2 |
| 2019/0044812 A1* | 2/2019 | Loftus | ................... | H04L 47/762 |
| 2020/0059510 A1* | 2/2020 | Russom | ................. | H04L 47/70 |

OTHER PUBLICATIONS

PCT International Search Report mailed Nov. 19, 2021 corresponding to PCT International Application No. PCT/EP2021/072237 filed Aug. 10, 2021.

* cited by examiner

AUTHENTICATING A COMMUNICATION PARTNER ON A DEVICE

CROSS-REFERENCE TO RELATED APPLICATIONS

This application claims priority to PCT Application No. PCT/EP2021/072237, having a filing date of Aug. 10, 2021, which claims priority to EP Application No. 20191531.1, having a filing date of Aug. 18, 2020, the entire contents both of which are hereby incorporated by reference.

FIELD OF TECHNOLOGY

The following relates to a method for authenticating a communication partner on a device, in which, in addition to a physical device implementation, at least one virtual device implementation assigned to the device is present.

BACKGROUND

Access to a device, such as for example a field device, a control device, an Internet of Things (IoT) device and the like, via a network connection has to be authenticated in order to prevent access by unauthorized parties. In the industrial environment, access may be made not only by other devices of an automation system, but also for example by a service engineer who accesses the device via a local, network-based service interface or else via remote maintenance access.

In the industrial environment, the concept of a digital twin, also called administration shell, is playing an increasingly important role. In this case, the digital twin implements a virtual representation of a real object.

The document SIEMENS A G ET AL: "Digital-Twin-Zertifikat" [Digital twin certificate], [PRIOR ART PUBLISHING GMBH, PRIOR ART PUBLISHING GMBH, MANFRED-VON-RICHTHOFEN-STR. 9, 12101 BERLIN GERMANY, Vol. www.priorartregiser.com, Feb. 21, 2019 (2019-02-01), pages 1-5, XP007022409, describes a digital twin certificate that is assigned both to a physical object and to the digital twin thereof. The digital twin certificate contains two public key entries that are assigned to the real object and the digital twin thereof and a link (URL) of the digital twin. The physical object uses the digital twin certificate in order to authenticate itself to an inspector. The inspector may then use the second public key to decrypt data transmitted in encrypted form from the digital twin and thus access same.

WO 2019/243429 A1 discloses a method for secure access for a client device to a cloud service in a cloud server, wherein the access is provided via an application on a server of a third party.

The configuration and the management of access authorizations for a service engineer or another communication partner and the configuration and management of corresponding inspection data is burdensome. For instance, password information, public key certificates or even authorization information has to be configured and managed in a user database, for example. In industrial environments, communication networks are also commonly isolated from external communication networks, meaning that a central security service, such as for example a directory service or authentication server, is not able to be used.

Such devices also commonly have low computing power or are supplied with power by a battery, meaning that complex queries or operations thereon should be avoided.

SUMMARY

An aspect relates to designing the access authentication for such devices to be as energy-saving and capacity-saving as possible and still to guarantee sufficient protection and flexible access possibilities.

According to a first aspect, embodiments of the invention relate to a method for authenticating a communication partner on a device, in which, in addition to a physical device implementation, at least one virtual device implementation assigned to the device is present, comprising the following steps:

receiving an access authorization for a communication partner in a first of these two device implementations, inspecting the access authorization by way of the first device implementation, and if the access authorization is deemed to be admissible, providing a credential for access to the second device implementation for the communication partner ST from the first device implementation to the communication partner, and allowing access to the second device implementation of these two device implementations for the communication partner by way of the credential.

This allows simplified access for the communication partner to the second device implementation. If the second device implementation receives the credential from the communication partner, then the second device implementation allows access without further inspections or with a reduced inspection scope. This makes it possible to divide tasks, for example for checking parameters between the two device implementations, and each individual device implementation is thus able to be unburdened. It is thus not necessary for all of the parameters or information to be checked to be available and to be managed for this purpose on both device implementations. In this case, the communication partner may transmit an access authorization either to the physical device implementation or to the virtual device implementation. If the access authorization is received by the physical device implementation, then this is the first device implementation and accordingly the virtual device implementation is the second device implementation. Conversely, if the access authorization is transmitted from the communication partner to the virtual device implementation and received there, this is the first device implementation. The virtual device implementation, following a successful check, provides a credential to the communication partner that allows access to the physical device implementation, which then constitutes the second device implementation. An access authorization is for example a password, an access code, an access token, biometric authentication information or else cryptographic authentication information using a secret/public cryptographic key or a digital certificate containing the public key.

In an embodiment, the credential is an access credential for an access authentication of the communication partner with the second device implementation and/or an access credential for access rights to the second device implementation granted to the communication partner.

The communication partner is thus able to authenticate itself with the second device implementation through the received credential and/or access authorizations may also be checked and granted there, for example in accordance with different security levels.

In an embodiment, the validity of the credential is time-limited.

This makes it possible to reduce misuse of the credential. The time limit may for example be a restricted validity period or else a predefined time interval within which the credential is valid. This limits when an access authentication for the second device implementation is allowed to be performed. Following the predefined validity period, no further access for the communication partner to the second device implementation is allowed. On the other hand, the time-limited validity of the credential makes it possible to limit how long at most the connection that is set up is allowed to remain intact.

In an embodiment, the number of access operations to the second device implementation by way of the credential is limited.

By way of example, the credential may be able to be used just once, for example be able to be used for only a single setup of the connection to the second device implementation. This allows flexible limiting of the use of the credential for the second device implementation and thus protects against undesirable unlimited use of the credential of the second device implementation. To this end, the second device implementation may enter a used credential into a list of used credentials. This makes it possible to recognize repeated use of a credential that has already been used and to reject the credential.

According to embodiments of the invention, the credential is revoked or not renewed when a communication connection between the first device implementation and the communication partner is ended.

This makes it possible to couple the connection of the communication partner to both device implementations. Access to the second device implementation is thus possible only as long as access to the first device implementation is also present.

In an embodiment, the credential is a digital certificate or a cryptographic key or an access token.

The digital certificate may for example be a certificate with a public key in accordance with a public key infrastructure method or an attribute certificate. Such a certificate is for example structured in accordance with the X.509 standard and contains the public key of an asymmetric cryptographic method. The credential may be a cryptographic key, in particular a key of a symmetric cryptographic method. If the credential is an access token, for example a token in accordance with an OAuth (Open Authorization) or a JSON (JavaScript Object Notation) Web or an SAML (Security Assertion Markup Language) standard, then this may be used to provide information regarding authorization of access, for example to protected resources, and here in particular to resources in the second device implementation. Using these known data structures means that only a small amount of modification effort is required to integrate these known structures.

In an embodiment, the credential comprises at least one of the following items of information: an identifier of the certificate of the communication partner, authorization information regarding the communication partner, a time restriction and/or geographical restriction for the access of the communication partner, a restriction on the usable communication media, a restriction on the usable communication protocols, information about the security state of the communication partner, an identity check value of the credential.

The information about the security state of the communication partner may indicate whether the configuration thereof and/or the firmware/software state thereof is admissible. This makes it possible to prevent a manipulated device from being able to be used for access.

The credential thus makes it possible to transmit a large amount of further information from the first device implementation to the second device implementation and thereby to communicate information and inspection results collected in the first device implementation to the second device implementation. Communication between the first and the second device implementation is also possible and is in particular expedient for transmitting information with regard to the authentication that has taken place.

In an embodiment, the credential is transmitted from the first device implementation to the communication partner and/or from the communication partner to the second device implementation when a secure communication connection is set up.

By way of example, the credential may be transmitted from the first device implementation to the communication partner within a TLS handshake when a communication connection is set up in accordance with the Transport Layer Security protocol TLS. The credential is thus ready for the communication partner at an earlier time and access authorizations and the like may already be taken into consideration at this time.

In an embodiment, the credential is transmitted from the first device implementation to the communication partner and/or from the communication partner to the second device implementation via an authenticated, existing communication connection.

This may be transmitted for example in the header of a connection in accordance with the Hypertext Transfer Protocol http connection. In this case, any combination of the type of transport of the credential, that is to say during connection setup or on an authenticated, existing communication connection, is possible for both communication connections, that is to say for a first communication connection between the first device implementation and the communication partner, on the one hand, and for a second communication between the communication partner and the second device implementation. By way of example, the credential may be transmitted from the first device implementation to the communication partner when a secure communication connection is set up, whereas the credential is transmitted between the second communication partner and the second device implementation on an authenticated, existing communication connection.

In an embodiment, address information regarding the second device implementation is additionally provided from the first device implementation to the communication partner.

This makes it easier for the communication partner to correctly address the second device implementation.

In an embodiment, the integrity and/or an admissibility of the current configuration of the communication partner is inspected when the access authorization is inspected by the first device implementation.

This may involve inspecting for example whether the firmware/software installed on the communication partner is valid and authorized, whether a so-called patch level, that is to say the up-to-dateness of the firmware or software, is up to date. It may furthermore be inspected whether a virus scanner is active and/or current virus models are present. This is generally also called "zero-trust access". Since these inspections are often burdensome, it is advantageous for these inspections of the integrity of the communication partner to be performed by the first device implementation upon connection setup with the communication partner. The credential issued by the first device implementation may then confirm to the second device implementation that the integrity of the communication partner has already been successfully inspected. The first device implementation may encode the ascertained and inspected configuration of the communication partner in cryptographically protected form, such that the second device implementation is able to check this information in terms of content, but does not have to acquire and assess it again itself.

In an embodiment, the first device implementation transmits information about the configuration of the device to the communication partner.

This enables less inspection effort for the communication partner. When the communication partner has inspected this information about the configuration of the first device via the first device implementation and has classed it as admissible, it uses the provided credential to access the second device implementation without performing another inspection of the information about the device configuration. Since a physical device and the digital twin thereof are two device implementations that are configured identically, another inspection is thus able to be avoided.

A second aspect of embodiments of the invention relate to a device comprising a physical device implementation and an assigned virtual device implementation, which are designed so as
- to receive an access authorization for a communication partner in a first of these two device implementations,
- to inspect the access authorization by way of the first device implementation, and
- if the access authorization is deemed to be admissible, to provide a credential for access to the second device implementation for the communication partner ST from the first device implementation to the communication partner and
- to allow access to the second device implementation of these two device implementations for the communication partner by way of the credential.

Such a device, which has both a physical device implementation and a virtual device implementation, for example a digital twin, is able to have complex checks, which take place in particular as part of a zero-trust authentication, performed not by the real device, that is to say the physical device implementation, but rather to have them delegated to the digital twin thereof, that is to say the virtual device implementation. The physical device implementation of a device may for example be an out-of-date device to which a digital twin is then assigned. The digital twin may be used to flexibly configure and update which information is required for zero-trust access and how this information should be transmitted.

In an embodiment, the virtual device implementation is embodied as an OPC UA server in accordance with an Open Platform Communication Unified Architecture standard.

If the OPC UA server is for example implemented as an integrated virtual device implementation on the physical device implementation, then it is possible for the device to provide a credential for access to a device-internal virtual device implementation upon access to the device, for example in the case of a control data communication or access to an integrated device web server. Specifically, when a secure communication connection is set up, temporary access to the OPC UA server of the physical device implementation may be configured and a credential may be transmitted to the communication partner. The communication partner is thus able to access the OPC UA server as virtual device implementation on the physical device implementation.

In an embodiment, the virtual device implementation is embodied on a central server, an edge server or on the physical device implementation of the device.

A central server or else an edge server positioned on the edge of an automation network provides greater computing power in comparison with the device itself and often comprises further databases such as for example a configuration or commissioning database via which it is possible to access a large amount of data about the device and about the communication partner quickly and with low transmission bandwidth, and thus possible to inspect the communication partner very efficiently and to query the access authorizations to the device.

A third aspect of embodiments of the invention relate to a computer program product (non-transitory computer readable storage medium having instructions, which when executed by a processor, perform actions) comprising a nonvolatile computer-readable medium that is able to be loaded directly into a memory of a digital computer, comprising program code portions that are suitable for performing the steps of the method.

Unless indicated otherwise in the following description, the terms "receive", "inspect", "provide", "allow" and the like refer to operations and/or processes and/or processing steps that change and/or generate data and/or convert data into other data, wherein the data may be represented or be present in particular as physical variables, for example as electrical pulses. The device and in particular the physical and the virtual device implementation therein may comprise one or more processors. A processor in connection with embodiments of the invention may be understood to mean for example a main processor, a microprocessor or a microcontroller. By way of example, it may also be a virtual processor or a soft CPU.

A computer program product, such as for example a computer program means, may for example be provided or delivered as a storage medium, such as for example memory card, USB stick, CD-ROM, DVD or else in the form of a file downloadable from a server in a network. This may take place for example in a wireless communication network through the transmission of a corresponding file to the computer program product or the computer program means.

BRIEF DESCRIPTION

Some of the embodiments will be described in detail, with reference to the following figures, wherein like designations denote like members, wherein.

DETAILED DESCRIPTION

Figure 1:
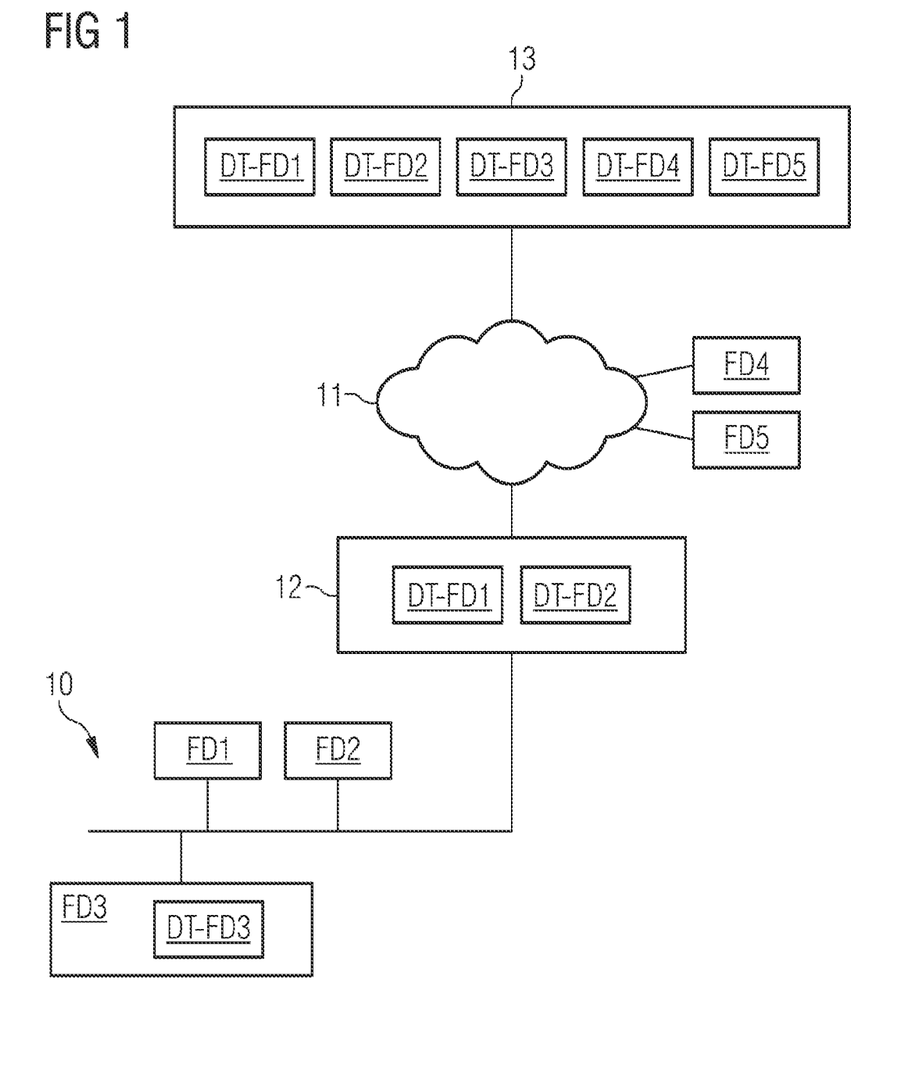
FIG. 1 shows a schematic illustration of one exemplary embodiment of a device incorporated into an installation network.

FIG. 1 shows a communication network containing multiple devices. The devices are for example field devices that are connected to a communication network of an industrial installation. Each device comprises a physical device implementation FD1, FD2, FD3, FD4, FD5 and at least one assigned virtual device implementation DT-FD1, DT-FD2, DT-FD3, DT-FD4, DT-FD5. The physical device implementations FD1, FD2, FD3 are connected to a subnetwork 10, for example an automation network. The subnetwork 10 is connected to the open network 11 via an edge server 12. The edge server 12 provides transfer functions for the interaction with components of the installation network that are arranged outside the subnetwork 10. The physical device implementations FD4, FD5 are connected directly to the open network 11, for example a company network or the public Internet. A central server, for example a cloud server, which makes available computing power and storage capacity centrally for the installation network, is connected via the public network 11.

The physical device implementations FD1, FD2 are respectively assigned two virtual device implementations DT-FD1, DT-FD2. A respective virtual device implementation DT-FD1, DT-FD2 is arranged in the edge server 12 and the cloud server 13. A virtual device implementation DT-FD3 in relation to the physical device implementation FD3 is arranged within the physical device implementation FD3 and additionally in the central server 13. The virtual device implementations DT-FD4 and DT-FD5 assigned to the physical device implementations FD4 and FD5 are arranged exclusively in the central server 13. A virtual device implementation is commonly also called a digital twin and may for example be embodied as an application. The virtual device implementation may in particular also be embodied as an OPC UA server.

Information about the physical device implementation may be queried by accessing the OPC UA server. The OPC UA server may be embodied outside the physical device implementation, for example in the edge server 12 or in the central server 13. The OPC UA server of a virtual device implementation may however also be implemented in the form of an OPC UA application service on the device itself, such as for example for the physical and virtual device implementation FD3, DT-FD3. In this case, the physical device implementation FD3 itself may provide a communication partner with a credential for access to the OPC UA server integrated into the physical device implementation. If the communication partner is able to access a first of the two device implementations, for example the physical device implementation FD3, it automatically also receives access to the second device implementation, here the virtual device implementation DT-FD3, in this case the OPC UA server of the device. This is particularly expedient when multiple instances of services run separately on the physical device implementation FD3. The communication partner may in particular access a web server of the physical device implementation, for example via an authenticated HTTP communication connection.

Figure 2:
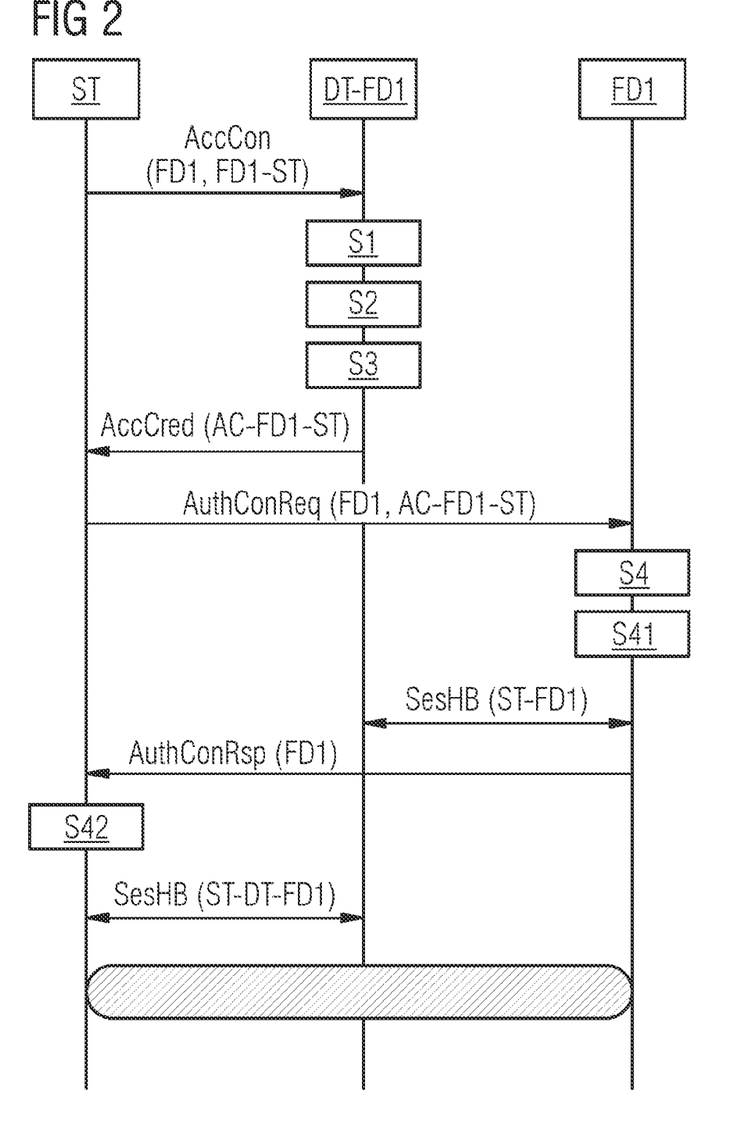
FIG. 2 shows a first exemplary embodiment of the method in the form of a message flowchart.

FIG. 2 then shows one specific exemplary embodiment in which a communication partner ST, for example a service engineer, connects to the virtual device implementation DT-FD1 of a device and queries a credential. The device is illustrated in FIG. 2 firstly with the virtual device implementation DT-FD1 and its physical device implementation FD1.

The communication partner ST authenticates itself with a first of the two device implementations, here the virtual device implementation DT-FD1. The virtual device implementation DT-FD1 in this case receives an access authorization for the communication partner ST in a first method step S1. The first device implementation then inspects the access authorization, see method step S2, and, in method step S3, provides a credential AC, denoted AC-FD1-ST in FIG. 2 for the credential for access to the physical device implementation FD1 for the communication partner ST, to the communication partner ST. The credential AC is transmitted here from the virtual device implementation DT-FD1 to the communication partner ST, for example through a confirmation message ACC-Cred.

The communication partner ST then transmits an authentication request AuthConReq that contains the credential AC to the second device implementation, here the physical device implementation FD1. The credential AC is inspected in the second device implementation and then access to the second device implementation FD1 is granted to the communication partner ST. This is confirmed with a confirmation message AuthConRsp from the second device implementation to the communication partner ST. The credential AC may, as in the example illustrated, be an access credential for an access authentication for the communication partner ST to the second device implementation. The credential AC may however also be an access credential for granted access rights for the communication partner to the second device implementation. The communication partner ST, which has access to the first device implementation, thus also has access to the second device implementation.

It is not necessary for the information about the access authentication and information about the access authorization to be managed on both device implementations. Administration effort is thus reduced, and fundamentally inconsistent access data configurations between the two device implementations are avoided. This in particular also makes it possible for a physical device implementation FD1 both to directly receive and check the access authorization of the communication partner ST and additionally to receive the credential AC for enabling access of the assigned virtual device implementation DT-FD1. It is also possible to receive logging messages both from the physical FD1 and from the virtual device implementation DT-FD1 regarding critical actions that are required in an audit, for example.

The validity of the issued credential AC may be time-limited. This usage restriction may be transmitted within the credential AC, but also outside the credential AC. The credential may to this end for example contain a timestamp. The validity period may in this case indicate a time interval in which access authorization or an access request to the second device implementation is admissible or how long at most the communication connection that is set up is allowed to remain intact. It is also possible for the number of access operations to the second device implementation using the credential AC to be limited. The credential AC may for example be able to be used only once, that is to say only to authorize a single setup of a connection to the second device implementation.

The issued credential AC is for example revoked or no longer renewed when the communication connection between the communication partner ST and the first device implementation, here the virtual device implementation DT-FD1, is ended. Access to the second device implementation is thus possible only for as long as access to the first device implementation also remains intact. If the connection, for example a communication session, to the first device implementation is ended, access to the second device implementation is thereby no longer possible either. This may be implemented for example via what is known as a heartbeat mechanism that is connected to the respective credential AC. To this end, a network connection is set up between the first and the second device implementation, here DT-FD1 and FD1, in which the two device implementations inform one another that they are ready for operation and are still able to perform their task, that is to say are alive. Such a "heartbeat" connection, see SesHB, is set up in method step S41 between the first and the second device implementation, and between the communication partner and the first device implementation in method step S42.

In the illustrated example, the virtual device implementation DT-FD1 may issue a credential AC that allows the communication partner ST to access the virtual device implementation DT-FD1, that is to say the digital twin. The transmitted and thus issued credential AC may be for example a digital certificate, a cryptographic key or an access token that enables or authorizes access authorizations to specific services or resources of the device.

The credential AC may contain for example a fingerprint of the certificate as identifier of the certificate of the communication partner ST. It is likewise possible to indicate the serial number and the issuer of the certificate. As an alternative, the credential AC may also contain or reference a secret that the communication partner ST and the two device implementations DT-FD1, FD1 have to know and use. In this case, this identifier of the certificate or even the entire credential AC may be cryptographically encrypted. The credential AC may furthermore contain authorization information, such as for example a role of the communication partner ST or attributes for specific actions. The credential AC may furthermore contain time restrictions, such as for example a time or a duration of access and/or the geographical position of the communication partner ST during access. The credential AC may furthermore contain restrictions on the usable communication media, for example only access via a wired connection or only a cordless communication connection by way of WLAN or mobile radio.

The credential AC may furthermore contain information about the security state of the communication partner ST. Such a security state may for example be ascertained by a local agent in the communication partner ST that regularly checks the system status of the communication partner ST. The credential AC may furthermore contain an integrity check value of the credential AC. This is for example a signature or a cryptographic checksum that enables an inspection of the integrity of the credential AC at the respective receiver, that is to say the communication partner ST or the second device implementation, here FD1.

The credential AC may be transmitted from the first device implementation, here DT-FD1, to the communication partner ST and/or from the communication partner ST to the second device implementation, here FD1, during setup of a secure communication connection. The credential AC may in particular be transmitted during an authentication and key agreement during a connection setup in accordance with a Telecommunications Layer protocol TLS, for example in a TLS extension field. In a TLS connection setup with the first device implementation TD-FD1, the communication partner ST is thus provided automatically with the credential, which is then used for the connection setup with the second device implementation FD1.

In addition to the credential AC, address information regarding the second device implementation, here FD1, may be provided from the first device implementation, here DT-FD1, to the communication partner ST. Such address information is for example the IP address of the second device implementation FD1 or else a name of the domain name server or a URL address of the second device implementation.

It is likewise possible to provide the credential AC via the Open Platform Communication Unified Architecture protocol OPC UA. The credential AC is transmitted in the form of payload data via a communication connection that has already been set up and authenticated, for example a Hypertext Transfer Protocol http connection. As an alternative, the credential AC may already be transmitted during setup of the secure communication connection, for example within a handshake in the TLS protocol. It is thus not necessary to manage any separate credentials AC for access to the first or second device implementation. The connection setup to the second device implementation may also take place more efficiently, in particular more quickly or using a smaller amount of data, since the provided credential AC is more compact than for example a digital certificate that is used in a complete authentication.

The first, here the virtual, device implementation DT-FD1 is thus issued to a provider for credentials AC for access to the physical device implementation FD1. The opposite case is also possible, in which a connection to the physical device implementation FD1 is set up first and a credential AC for the connection setup with the virtual device implementation DT-FD1 is configured via this connection. A credential AC in the form of a digital certificate structured in accordance with the X.509 standard may in particular have the following extension for transmission of one or more of the items of information mentioned. The following extension constitutes an example and is written in an abstract syntax notation ASN.1:

```
AccessControlToken EXTENSION ::= {
  peerAuthentication ::= CHOICE {
    PCertificate        [0] Certificate OPTIONAL,
    FPCertificate       [1] BIT STRING OPTIONAL -- Fingerprint
  }
  peerAuthentication ::= CHOICE {
    roleInformation     [0] RoleID,
    operations          [1] Operations OPTIONAL,
  }
  deviceState           DevState,
  Validity              Time
}
RoleID::= INTEGER (-32768..32767) -- predefined role identifications
                                     (e.g. IEC 62351-8)
Operation::= ENUMERATED { Add (1), Delete (2), Change (3) }
DevState::= ENUMERATED {
  OsPassed      (1),   -- Operation system has passed security
check
  OsFailed      (2),   -- Operation system has failed security
check
  OsAppPassed   (3),   -- Operation system and installed applica-
tions
                          have passed security check
  OsAppFailed   (4) }  -- Either operation system or installed
                          applications have failed security check
```

This means that for example the virtual device implementation DT-FD1 is able to issue a digital certificate that allows protected access to the assigned physical device implementation FD1. The physical device implementation is in this case the actual physical device, in the example of FIG. 1 the field device FD1. The digital certificate as credential is a self-signed certificate that is issued by the first device implementation of the device and is inspected and accepted by the second device implementation of the same device. This does not require setting up and operating any generally recognized private key infrastructure (PKI), since these special certificates or credentials are issued and inspected only by an individual device itself.

Figure 3:
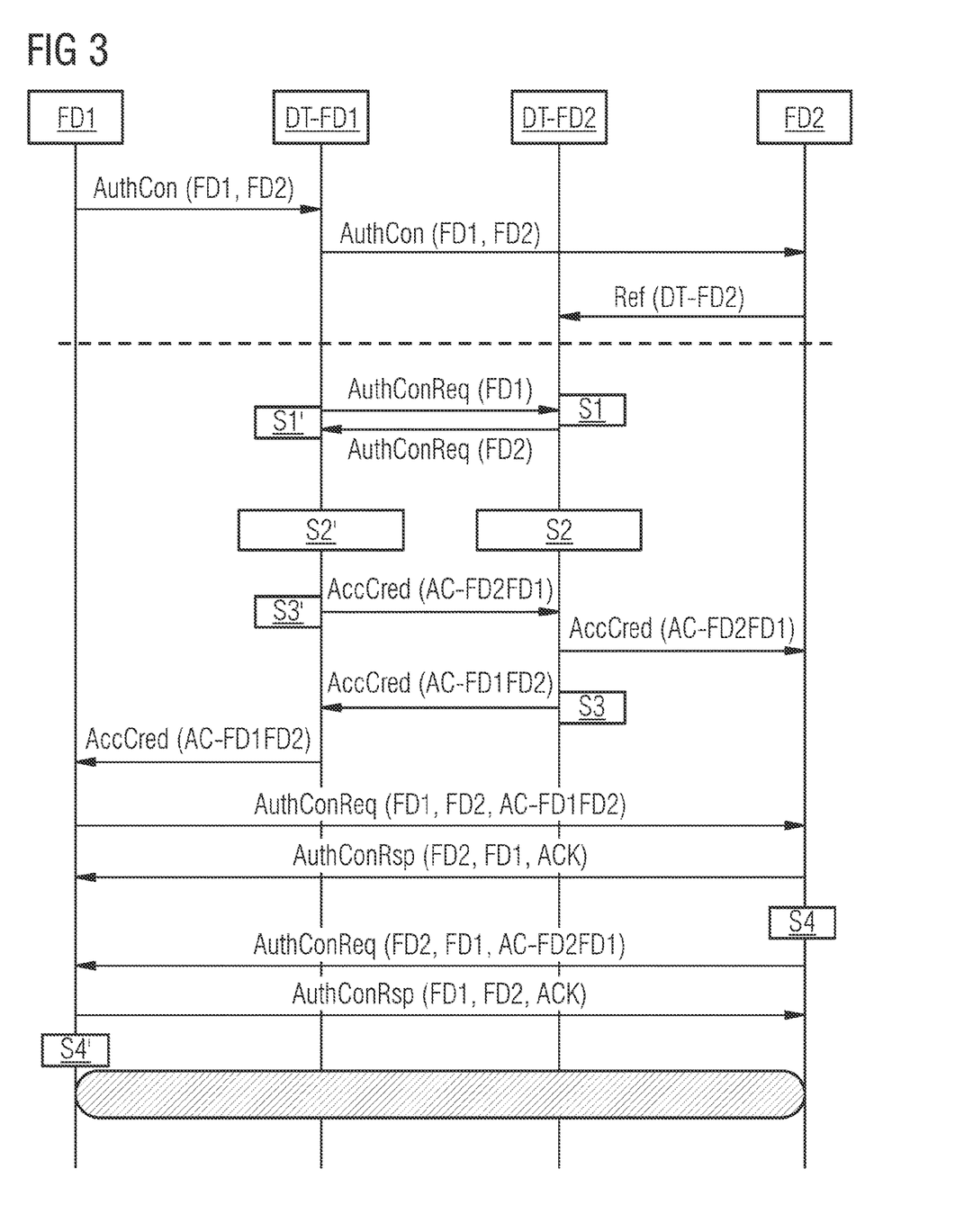
FIG. 3 shows a second exemplary embodiment of the method, in which two devices each having a physical and a virtual device implementation perform an authentication, in the form of a message flowchart.

FIG. 3 shows one exemplary embodiment of access of a field device FD1 to a second field device FD2, in which the device FD1 sets up a cryptographically protected mutually authenticated connection with the device FD2. The actual, complex authentication between the physical device implementations FD1 and FD2 is however carried out in each case by the digital twins thereof, that is to say the virtual device implementations DT-FD1, DT-FD2 thereof.

The physical device implementation FD1 in this case directs the request to its own virtual device implementation DT-FD1. In the example illustrated, this first transmits an authentication request AuthCon to the physical device implementation FD2. From there, the request is referred internally to the assigned virtual device implementation DT-FD2 thereof. The virtual device implementation DT-FD2 then initiates authentication of the virtual device implementation DT-FD1 with an authentication request. In this case, authentication of the virtual device implementation DT-FD1 is requested from the virtual device implementation DT-FD2. In embodiments, the method steps of the authentication in which the virtual device implementation DT-FD1 asks the virtual device implementation DT-FD2 as communication partner are identified by the reference signs S1, S2, S3, S4. In embodiments, the method steps of the authentication of the second device implementation DT-FD2 as communication partner with the virtual device implementation DT-FD1 are method steps illustrated with the reference signs S1', S2', S3', S4'.

The respective first device implementation receives, with the authentication request message AuthConReq, access authorization for the communication partner, see S1, S1', inspects this access authorization, see S2, S2', and provides the credentials AC-FD1FD2, AC-FD2FD1 to the communication partner, that is to say here the virtual device implementation DT-FD1 or the virtual device implementation DT-FD2, respectively. The respective credentials AC-FD1FD2, AC-FD2FD1 are transmitted from the first device implementation, here DT-FD1 or DT-FD2, to the respective assigned second device implementation, here FD1 or FD2, with the message ACC-Cred. The physical device implementation FD1 then transmits an authentication request AuthConReq with the credential AC-FD1FD2 to the physical device implementation FD2 and receives therefrom an access permission, which is confirmed with a confirmation message AuthConRsp, see in this regard also illustrated method step S4. In method step S4', the second device implementation FD1, following an authentication request by the second device implementation FD2 and the credential AC-FD2FD1 contained therein, accordingly allows access to the physical device implementation FD1.

The two virtual device implementations thus each inspect the communication partner, that is to say the physical device implementations FD2 and FD1. The physical device implementation may be for example a device already present in a network that does not support a zero-trust access check.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for authenticating a communication partner on a device comprising a physical device implementation and a virtual device implementation, said method comprising:

receiving, by the virtual device implementation from the communication partner, an access authorization for the communication partner, said virtual device implementation being a digital twin of the physical device implementation;

inspecting, by the virtual device implementation, the access authorization; and in response to the access authorization being deemed, from said inspecting, to be admissible, providing, by the physical device implementation to the communication partner, a credential that allows access, by the communication partner, to the physical device implementation, wherein the credential is maintained only while a communication connection between the virtual device implementation and the communication partner exists.

2. The method as claimed in claim 1, wherein the credential authenticates the communication partner for said access to the physical device implementation.

3. The method as claimed in claim 1, wherein a validity of the credential is time-limited.

4. The method as claimed in claim 1, wherein a number of access operations to the physical device implementation by way of the credential is limited.

5. The method as claimed in claim 1, wherein the credential is a digital certificate or a cryptographic key or an access token.

6. The method as claimed in claim 1, wherein the credential comprises at least one of the following items of information:
   an identifier of a certificate of the communication partner;
   authorization information regarding the communication partner;
   a time restriction and/or a geographical restriction for the access of the communication partner,
   a restriction on usable communication media;
   a restriction on usable communication protocols;
   information about a security state of the communication partner; and
   an integrity check value of the credential.

7. The method as claimed in claim 1, wherein the credential is transmitted from the virtual device implementation to the communication partner and/or from the communication partner to the physical device implementation in response to a secure communication connection having been set up.

8. The method as claimed in claim 1, wherein the credential is transmitted from the virtual device implementation to the communication partner and/or from the communication partner to the physical device implementation via an authenticated, existing communication connection.

9. The method as claimed in claim 1, wherein address information regarding the physical device implementation is additionally provided from the virtual device implementation to the communication partner.

10. The method as claimed in claim 1, wherein an integrity and/or an admissibility of a current configuration of the communication partner is inspected when the access authorization is inspected by the virtual implementation.

11. The method as claimed in claim 1, wherein the virtual device implementation transmits information about the configuration of the device to the communication partner.

12. A computer program product, comprising a computer readable hardware storage device having computer readable program code stored therein, said program code executable by a processor of a computer system to implement the method of claim 1.

13. A device comprising a physical device implementation and a virtual device implementation, said device configured to perform a method for authenticating a communication partner on the device, said method comprising:

receiving, by the virtual device implementation from the communication partner, an access authorization for the communication partner, said virtual device implementation being a digital twin of the physical device implementation;

inspecting, by the virtual device implementation, the access authorization;

in response to the access authorization being deemed, from said inspecting, to be admissible, providing, by the physical device implementation to the communication partner, a credential that allows access, by the communication partner, to the physical device implementation,     wherein the credential is maintained only while a communication connection between the virtual device implementation and the communication partner exists.

14. The device as claimed in claim 13, wherein the virtual device implementation is an Open Platform Communication Unified Architecture server in accordance with an Open Platform Communication Unified Architecture standard.

15. The device as claimed in claim 13, wherein the virtual device implementation is embodied on a central server, an edge server or on the physical device implementation of the device.

* * * * *